(12) United States Patent
Menke et al.

(10) Patent No.: US 8,978,181 B2
(45) Date of Patent: Mar. 17, 2015

(54) MEDICAL EXAMINATION TABLE WITH INTEGRATED SCALE

(75) Inventors: Robert Menke, Versailles, OH (US);
Douglas Oda, Lewisburg, OH (US);
John Alton, Versailles, OH (US)

(73) Assignee: Midmark Corporation, Versailles, OH (US)

( * ) Notice: Subject to any disclaimer, the term of this patent is extended or adjusted under 35 U.S.C. 154(b) by 322 days.

(21) Appl. No.: 13/425,773

(22) Filed: Mar. 21, 2012

(65) Prior Publication Data
US 2013/0247300 A1 Sep. 26, 2013

(51) Int. Cl.
*A47B 7/00* (2006.01)
*A61G 13/00* (2006.01)
*A61G 13/12* (2006.01)
*A61G 13/08* (2006.01)
*A61G 7/05* (2006.01)

(52) U.S. Cl.
CPC ........ *A61G 13/1225* (2013.01); *A61G 13/0018* (2013.01); *A61G 13/08* (2013.01); *A61G 2007/0527* (2013.01); *A61G 2203/12* (2013.01); *A61G 2203/20* (2013.01); *A61G 2203/36* (2013.01); *A61G 2203/44* (2013.01); *A61G 2203/726* (2013.01)
USPC ................... 5/611; 177/144; 5/600; 5/81.1 R

(58) Field of Classification Search
USPC ........................................................ 177/144
See application file for complete search history.

(56) References Cited

U.S. PATENT DOCUMENTS

| 3,239,018 | A | 3/1966 | Mazursky |
| 4,363,368 | A | 12/1982 | Paddon et al. |
| RE32,052 | E | 12/1985 | Rosenberg et al. |
| 4,799,559 | A * | 1/1989 | Murdter et al. ............... 177/124 |
| 5,715,548 | A | 2/1998 | Weismiller et al. |
| 5,873,137 | A * | 2/1999 | Yavets-Chen ..................... 5/713 |
| 7,610,637 | B2 | 11/2009 | Menkedick et al. |
| 7,703,158 | B2 * | 4/2010 | Wilker et al. ..................... 5/616 |
| 7,784,126 | B2 * | 8/2010 | Meissner et al. .................. 5/600 |
| 7,962,981 | B2 * | 6/2011 | Lemire et al. ..................... 5/616 |
| 7,978,084 | B2 | 7/2011 | Dixon et al. |
| 2005/0178590 | A1 * | 8/2005 | Martin-Woodin et al. ... 177/144 |
| 2007/0296600 | A1 * | 12/2007 | Dixon et al. ............... 340/573.1 |
| 2009/0260158 | A1 * | 10/2009 | Kazuno et al. .................... 5/600 |
| 2012/0124744 | A1 * | 5/2012 | Hornbach et al. ................ 5/611 |

* cited by examiner

*Primary Examiner* — Nicholas Polito
*Assistant Examiner* — Richard G Davis
(74) *Attorney, Agent, or Firm* — Frost Brown Todd LLC

(57) ABSTRACT

An examination table including an integrated scale with automatic taring, weight capture in the presence of patient motion, and automatic table height adjustment. The examination table includes a controller that periodically tares the integrated scale when a patient is not on the table so that the scale is ready to measure the weight of a patient without manual taring by the table operator. When a patient is on the table, the controller detects the presence of patient motion based on signals from load sensors, and captures weights for patients experiencing uncontrolled motion or tremors by averaging and comparing sampled weight values over predetermined periods of time. To insure that the patient is fully supported by the examination table before weighing the patient, the controller automatically adjusts the height of the examination table support surface so that the patient's feet are not touching the floor prior to weighing the patient.

22 Claims, 10 Drawing Sheets

MEDICAL EXAMINATION TABLE WITH INTEGRATED SCALE

TECHNICAL FIELD

This invention relates generally to examination tables for medical procedures, and more specifically, an examination table with an integrated scale.

BACKGROUND

Articulating medical examination tables are typically provided in medical examination rooms to support and place patients in various positions that facilitate examination and/or the performance of various medical procedures. Conventional examination tables typically have a table assembly that includes seat section and a back section supported on a base unit. The seat and back sections are moveable relative to one another and the base so that a patient can be placed in a desired position. The seat and/or back sections may be articulated by actuating mechanisms such as motors, pneumatic or hydraulic cylinders, or other devices to move the seat and back sections between the various positions and to adjust the height of the seat and back sections relative to the base. Most tables typically have a back section that is maneuverable from a first inclined orientation, relative to the seat section, for supporting a patient in an initial seated position, and a generally horizontal orientation, relative to the seat section, for supporting a patient in a supine position.

Patients are routinely weighed during medical examinations. To facilitate weighing the patient, the examination table may include a built in, or integrated, scale. In this way, the patient may be weighed without having a separate scale in the examination room, and without requiring the patient—who may be ill and in a state of undress—to leave the examination room during the examination. The integrated scale will typically include one or more load sensors that support at least a portion of the examination table and that generate signals proportional to the force exerted on the load sensors by the supported portion of the examination table. These signals are, in turn, provided to a scale or control unit, which determines and displays the patient's weight. However, conventional examination table scales have several drawbacks.

For example, to provide an accurate patient weight, the examination table scale must account for the weight of the supported portion of the examination table as well as any items that may be sitting on or attached to the supported portion. A scale must therefore be "zeroed" or tared just prior to use to ensure that only the weight of the patient is measured. Because patients are typically shown into the examination room before the arrival of the medical staff member who will be conducting the examination, the patient will normally be seated on the examination table when the staff member arrives. Thus, the staff member will often be required to either ask the patient to get off the examination table so that the scale may be tared, or skip the taring step. Exiting the examination table may be uncomfortable for the patient, who may be in a frail condition. The staff member may also be reluctant to inconvenience the patient, and may therefore choose to skip taring the scale. Staff members may also simply forget to tare the scale prior to taking the patient's weight.

Another problem encountered in using conventional integrated examination table scales involves the height of the table assembly. To facilitate elderly or disabled persons getting onto and off of the examination table, as well as to improve overall patient comfort during an examination, it is sometimes desirable that the overall height of the table be low enough so that the patient's feet touch the floor while they are in a seated position. However, this creates a problem with regard to weighing the patient because all of the patient's weight is not supported by the table assembly unless the patient's feet are suspended above the floor.

Still another problem involves patients who suffer from conditions that cause involuntary motion. Patients with severe tremors, such as those caused by advanced stages of Parkinson's disease, are often unable to hold still long enough for the table scale to measure a stable weight.

Therefore, there is a need for an examination table with an integrated scale that does not require taring by medical staff, that provides easy ingress/egress to patients, and that can accurately measure the weight of patients who suffer from involuntary movement.

SUMMARY

Because of the challenges associated with weighing patients on examination tables with integrated scales, there is a need for systems and methods to ensure that the scale is tared prior to the patient getting on the examination table, that can account for weight variations caused by involuntary motion in the patient, and that can determine if the patient's full weight is being supported by the table.

To ensure that the weight of the patient is accurately measured, a scale built into an examination table should be tared prior to use to account for the weight of the weighing platform and any other items that may have been placed on the table. However, medical staff members will occasionally forget to perform this step, which may result in an inaccurate weight measurement. In a first aspect of the present invention, this problem is addressed by providing an auto taring feature that detects the difference between inanimate objects (e.g. supplies in the drawers of the exam table) and the patient. Through a combination of one or more of a seat sensor, motion sensing, timers, and weight thresholds, the auto taring feature determines if a patient is present on the examination table, and periodically tares the table when a patient is not present. The auto taring feature thereby maintains the table in a tared state so that the table is ready to measure the weight of a patient without a staff member having to remember to tare the table immediately before the patient gets on the table.

In order to provide an accurate weight, conventional scales require the patient to hold still for at least a few seconds. If the scale does not detect a stable weight for the required time period, the scale will not report the patient's weight. Patients with severe tremors, such as patients with Parkinson's disease, are typically unable to hold sufficiently still for a long enough period of time for conventional scales to report a stable weight. In a second aspect of the present invention, this problem is addressed by a weight capture feature that uses motion sensing and timers to determine if the patient is unable to stop moving. If the patient is unable to stop moving, the weight capture feature adapts the scale to compensate for this motion by averaging weight samples over a plurality of sample periods and validating consecutive averages that are within a predetermined threshold. These validated weight samples are then further averaged to produce a patient weight, which is displayed to the staff member if the validated weight samples fall within a determined weight range. The scale may also include a filter to remove variations in the sensed weight and thereby obtain a stable patient weight.

In order to provide easy ingress and egress to the patient, the examination table will typically be low enough so that the patient's feet are touching the floor when the patient is seated on the table. However, in order to determine an accurate patient weight, the table must be supporting the entire weight of the patient. The table must therefore be high enough so that the patient's feet are off the floor before a weight measurement may be taken. In a third aspect of the present invention, this problem is addressed by determining if a patient's feet are on the floor, and if so, automatically raising the examination table so that the patient's feet are off the floor before determining the patient's weight.

To this end, the examination table controller includes one or more of a seat sensor and/or an examination table load sensor output signal monitoring circuit. The controller determines if a patient is present based on one or more of a seat sensor output signal, a weight distribution of the table determined from the load sensor output signals, and/or the presence of motion determined from the load sensor output signals. If the controller determines a patient is present, the algorithm may raise the seat to a predetermined height in response to a request that the patient be weighed, such as an operator pressing a weight request button on the table controller interface.

In an another embodiment, the controller may determine if the patient's feet are on the floor based on the determined weight distribution, and begin comparing the current load sensor output signals to prior output signals. If the patient's feet are determined to be on the floor, the controller will begin raising the examination table in response to a request that the patient be weighed. As the patient is raised, the weight and/or weight distribution between the load sensors will change as the table is raised until the patient's feet are fully suspended. The controller continues comparing current load sensor output signals to previous signals to determine the moment when the patient's feet are clear of the floor, at which point the controller stops raising the table. If the controller determines that the patient's feet are not on the floor when the patient's weight is requested, the patient's weight may be provided to the attending staff member without any movement of the examination table. The examination table may thereby automatically be raised by only the amount necessary to determine the patient's weight.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

Figure 1:
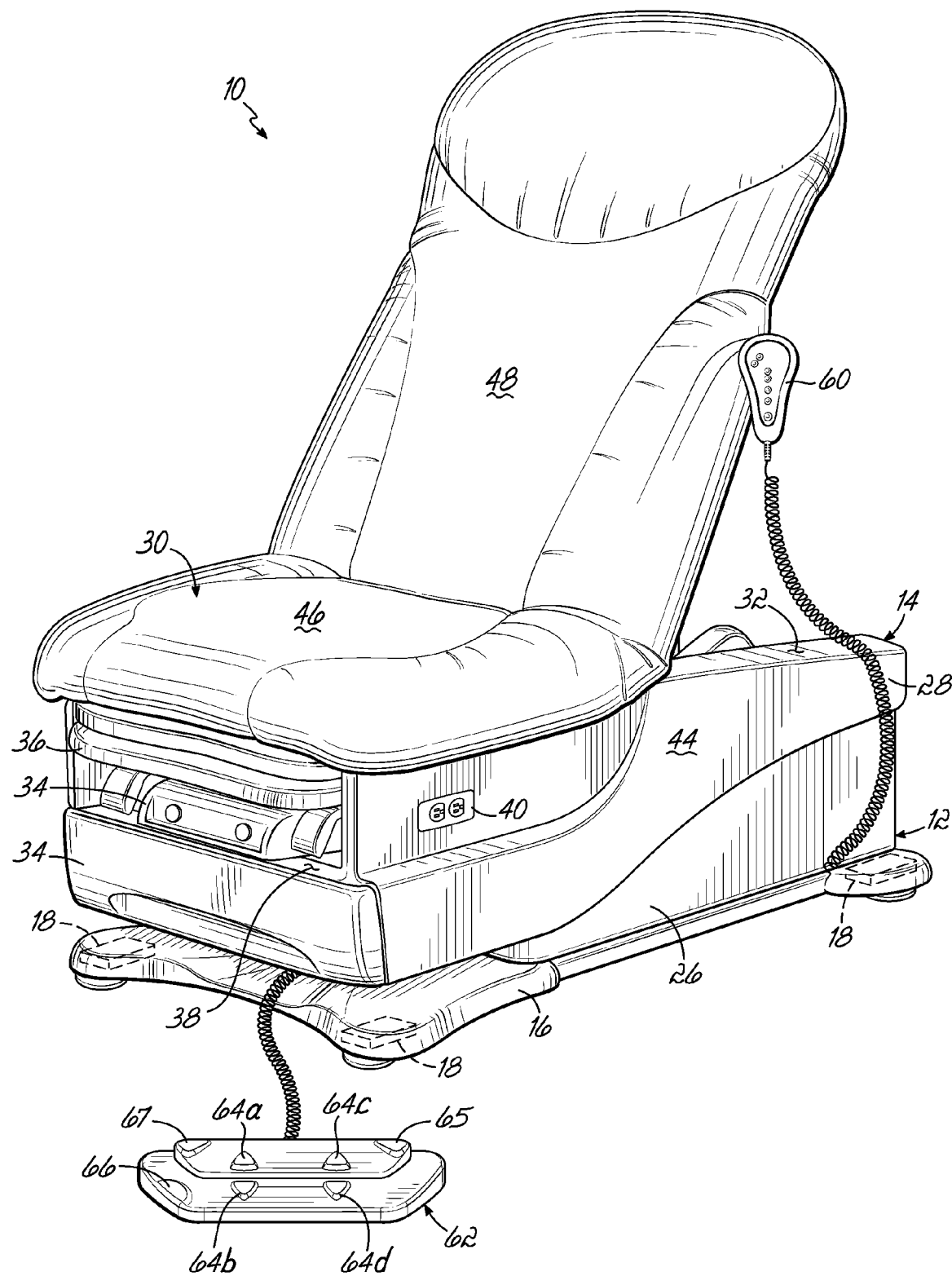
FIG. 1 is a perspective view of an exemplary medical examination table in accordance with the principles of the present disclosure.
Figure 2:
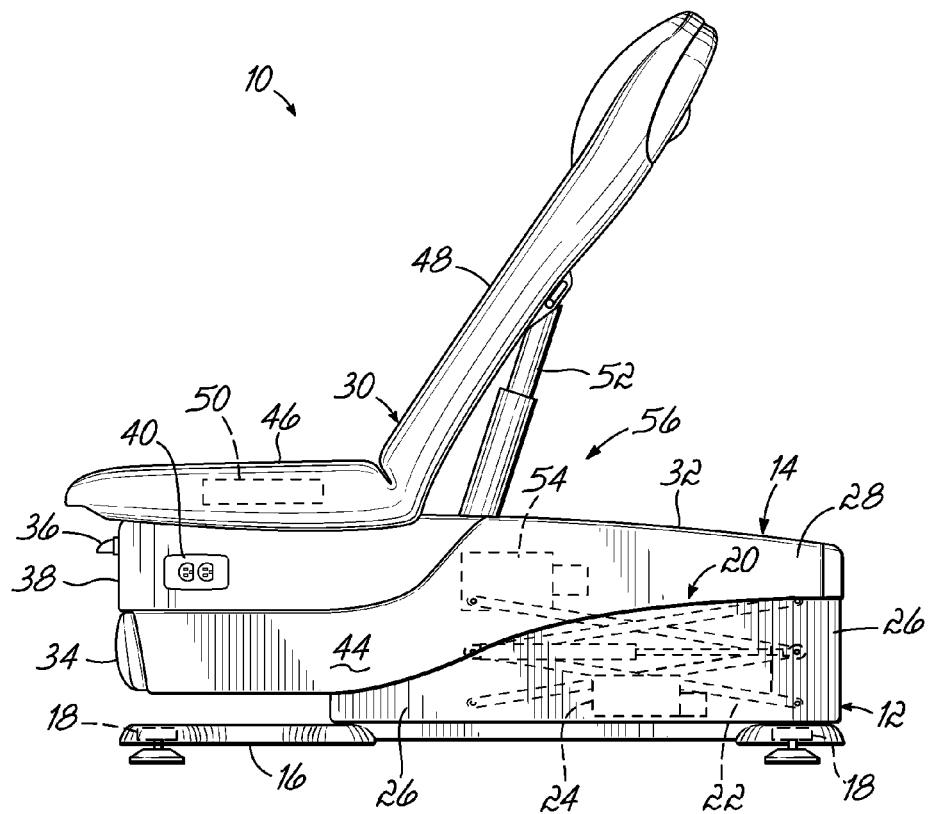
FIG. 2 is a side view of the medical examination table of FIG. 1, showing the seatback in an upright position.
Figure 4:
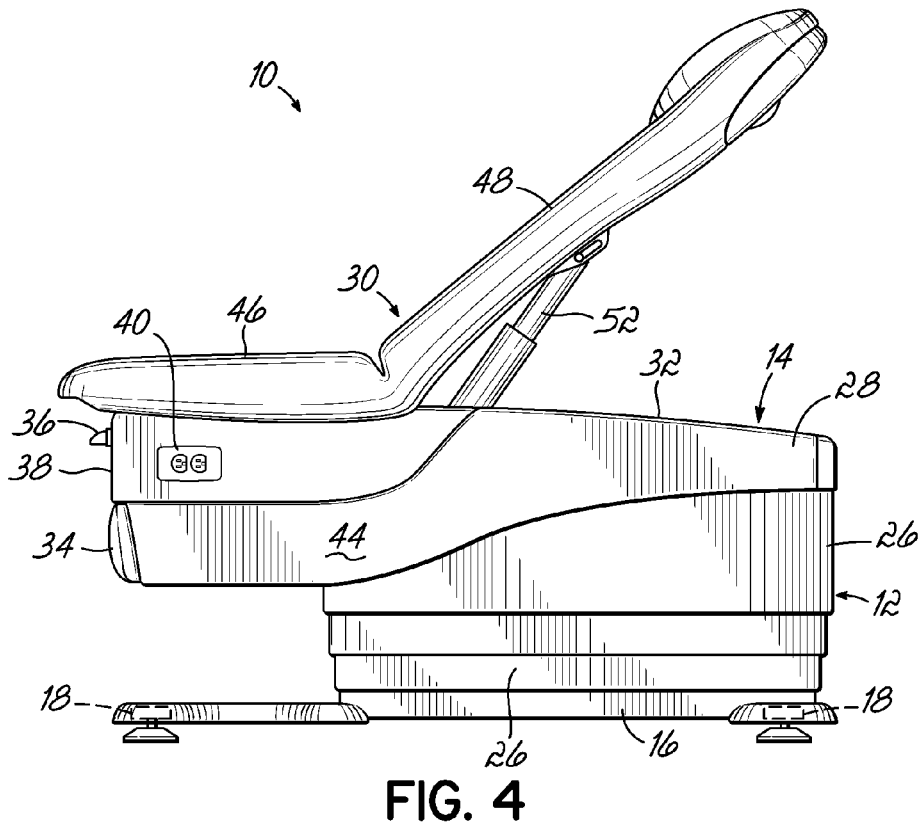
FIG. 4 is a side view of the medical examination table of FIG. 1, showing the seatback in a reclined position.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments may have been enlarged or distorted relative to others to facilitate visualization and provide a clear understanding.

DETAILED DESCRIPTION

Referring now to the drawings and to FIGS. 1-4 in particular, an exemplary examination table 10 consistent with embodiments of the present invention is presented. The examination table 10 includes a base assembly 12 and a table assembly 14 disposed above the base assembly 12. The base assembly 12 is includes a base member 16 that supports the examination table 10. The base member 16 includes a plurality of load sensors 18 (shown in phantom) that support the weight of the examination table 10, with each load sensor 18 being located generally at one of the corners of the base member and generating a signal proportional to the force being exerted on the load sensor 18 by the base member 16. The base assembly 12 also includes a lift mechanism 20 (shown in phantom form in FIG. 2) engaged with the base member 16 and the table assembly 14. In the embodiment shown, the lift mechanism 20 includes a scissor lift 22 that supports the table assembly 14 and a lift motor 24, and is operable to move the table assembly 14 generally upward and downward with respect to the base member 16.

The lift mechanism 20 and all other internal components of the base assembly 12 are stored within a telescoping shell cover 26. The telescoping shell cover 26 telescopes outwardly from the base member 16 to the table assembly 14 to conceal the lift mechanism 20 from patients and table operators and to prevent injuries to fingers and other body parts that could become caught in the lift mechanism 20.

The table assembly 14 further includes a table frame 28 and a support surface 30. The table frame 28 defines a generally planar upper surface 32 for supporting the support surface 30. The table frame 28 may also include a plurality of storage drawers 34 and retractable instrument pans 36 at a front surface 38 of the table frame 28. The storage drawers 34 and retractable instrument pans 36 provide convenient storage areas for the table operator while performing patient examinations and procedures. The table frame 28 may further include at least one electrical outlet 40 positioned along a side surface 44 of the table frame 28. The electrical outlet 40 may powered by a power supply of the examination table 10, and provides a convenient source of electrical power for accessory devices used with the examination table 10 or during a medical procedure.

The support surface 30 is divided into a seat portion 46 and a backrest portion 48. The support surface 30 is generally padded or cushioned to more comfortably accommodate a patient. The seat portion 46 is rigidly coupled to the upper surface 32 of the table frame 28 adjacent to the front surface 38, and may include a seat sensor 50 configured to generate a signal indicative of the presence or absence of a patient. The backrest portion 48 extends behind the seat portion 46 and may be pivoted with respect to the seat portion 46. A lift cylinder 52 or similar device is engaged with the backrest portion 48 and the table frame 28 to pivot the backrest portion 48. The lift cylinder 52 is operatively coupled to a backrest motor 54 to provide a reclining mechanism 56 that urges the backrest portion 48 into a desired position in response to activation by a controller 58 (FIG. 5). The lift mechanism 20 and reclining mechanism 56 combine to form an actuation system for adjusting the examination table 10 through various positions such as the initial position shown in FIG. 4. It will be appreciated that various other lifting mechanisms and reclining mechanisms could be substituted for the lift mechanism 20 and the reclining mechanism 56. Embodiments of the invention are thus not limited to any particular type of lift or reclining mechanism.

Figure 3:
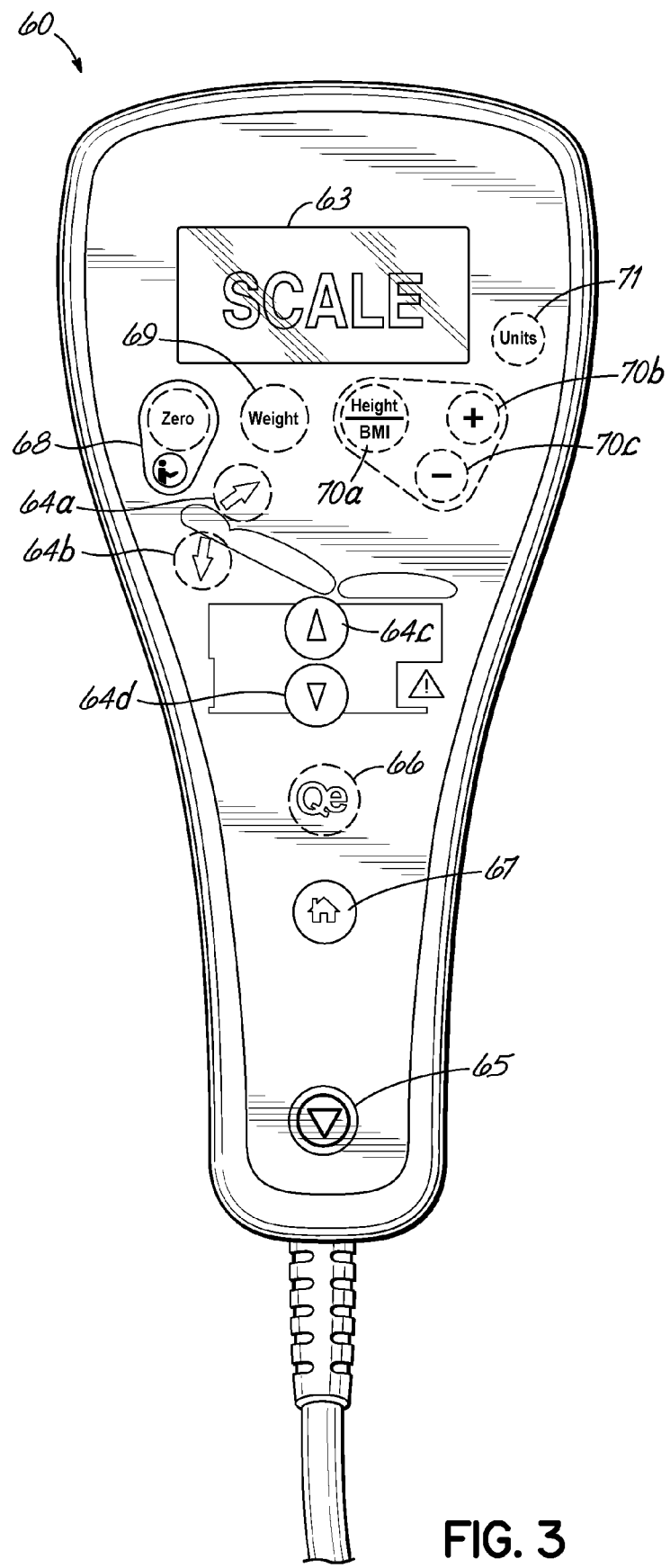
FIG. 3 is a front view of a control panel for use with the medical examination table of FIG. 1.

The examination table 10 may further include a control panel 60 and a foot pedal 62 as shown in FIGS. 1 and 3, with each of the control panel 60 and foot pedal 62 including a plurality of buttons for controlling the operation of the examination table 10. Although shown as being coupled to the examination table 10 by cables in FIG. 1, persons having ordinary skill in the art will understand that the control panel 60 and foot pedal 62 may also be placed in communication with the controller 58 via a wireless connection. To this end, the control panel 60 and foot pedal 62 may employ a wireless protocol, such as Bluetooth®, which is an open wireless standard managed by Bluetooth SIG, Inc. of Kirkland Wash.; Zigbee®, which is an open wireless standard managed by the ZigBee Alliance of San Ramon Calif.; a proprietary wireless protocol, or any other suitable wireless protocol to communicate with the controller 58.

The control panel 60 is configured to be held in an operator's hand, and includes a display 63 having one or more visual indicators suitable for displaying information to the table operator, such as but not limited to an alphanumeric display, a touch screen, one or more light emitting diodes (LEDs), and/or a liquid crystal display (LCD). Manual control buttons 64a, 64b, 64c, 64d allow the operator to position the support surface 30 in a desired position by causing the lift motor 24 and/or backrest motor 54 to be selectively driven in a forward or a reverse direction. To this end, in the exemplary embodiment of the control panel 60 illustrated in FIG. 3, a first backrest position control button 64a causes the backrest motor 54 to drive the backrest portion 48 toward an upright position, and a second backrest position control button 64b causes the backrest motor 54 to drive the backrest portion 40 toward a reclined position. Similarly, a first height control button 64c causes the lift motor 24 to drive the support surface 30 upward, thereby raising the height of the support surface 30, and a second height control button 64d causes the lift motor 24 to drive the support surface 30 downward, thereby lowering the support surface 30.

The control panel 60 and foot pedal 62 may also include a calibration button 65 that activates a calibration algorithm for calibrating position tracking of the support surface 30 and the backrest portion 48, and pre-set chair position buttons 66, 67 for actuating the controller 58 to execute a one-touch movement algorithm. The aforementioned calibration and one-touch movement algorithms are described in more detail in U.S. Patent Publication No. 2012/0042451 to Jones et al., the disclosure of which is incorporated herein by reference in its entirety.

The control panel 60 may further include a tare scale button 68 for manually taring the scale, a weight request button 69 for initiating a patient weighing operation, Body Mass Index (BMI) buttons 70a-70c for determining the patient's BMI, and a unit selection button 71 for selecting the units in which weight and/or height are displayed. To determine the BMI for a patient, the operator may activate the BMI function by pressing button 70a while a patient's weight is being displayed. Activating the BMI button 70a may cause a height to be displayed, which the operator may adjust using the patient height adjustment buttons 70b and 70c. Once an appropriate height is selected, the operator may cause a BMI based on the selected height and the patient's weight to be displayed by activating the BMI button 70a a second time. The units in which the weight, height, and or BMI are displayed may be selected by pressing the unit selection button 71, thereby causing the display 63 to cycle through different suitable units of measure, such as pounds, kilograms, inches and/or centimeters, until the desired units are displayed.

Figure 5A:
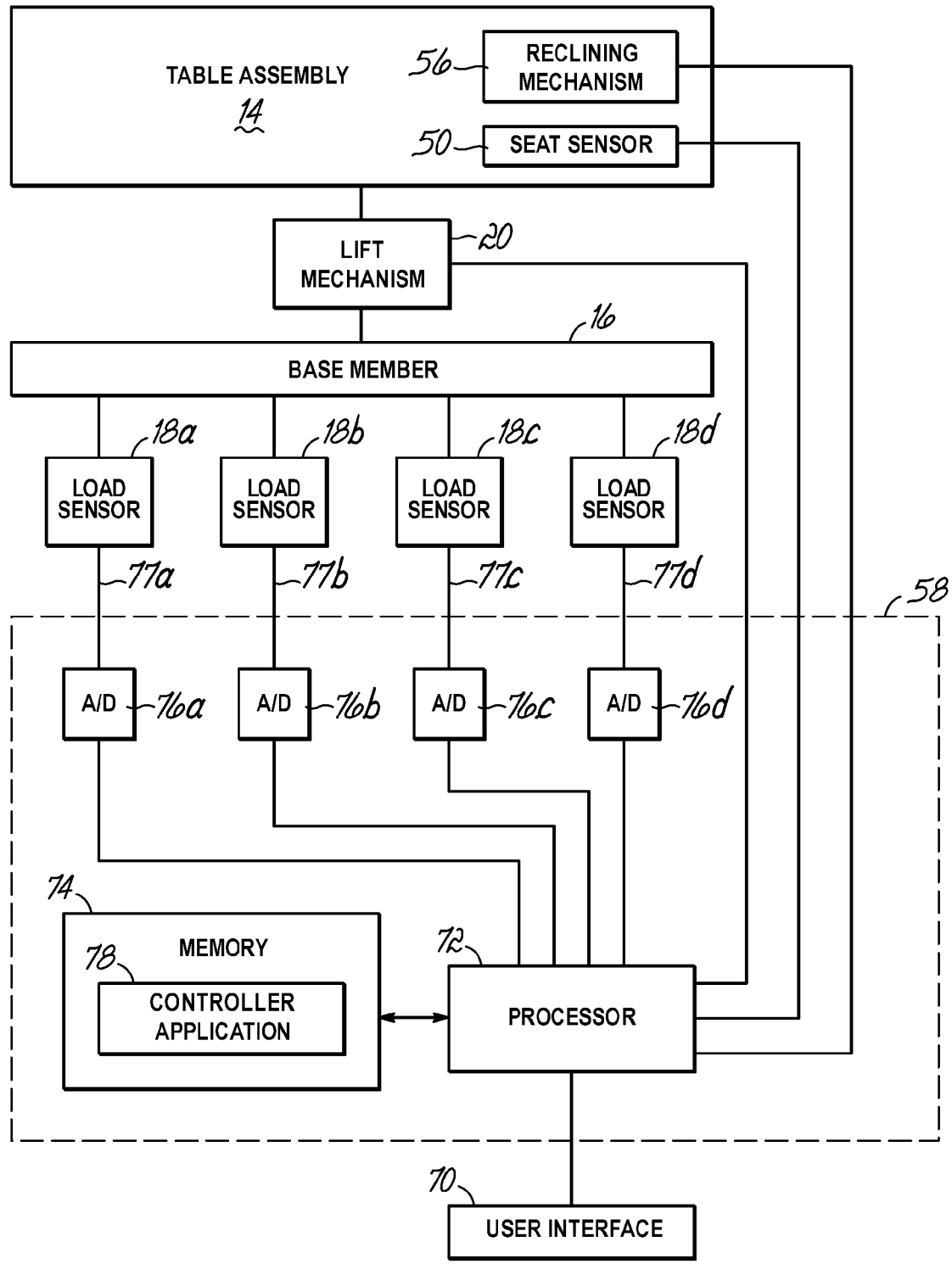
FIG. 5A is a schematic block diagram of an exemplary medical examination table control system including load sensors and a controller for use with the medical examination table of FIGS. 1-4.
Figure 5B:
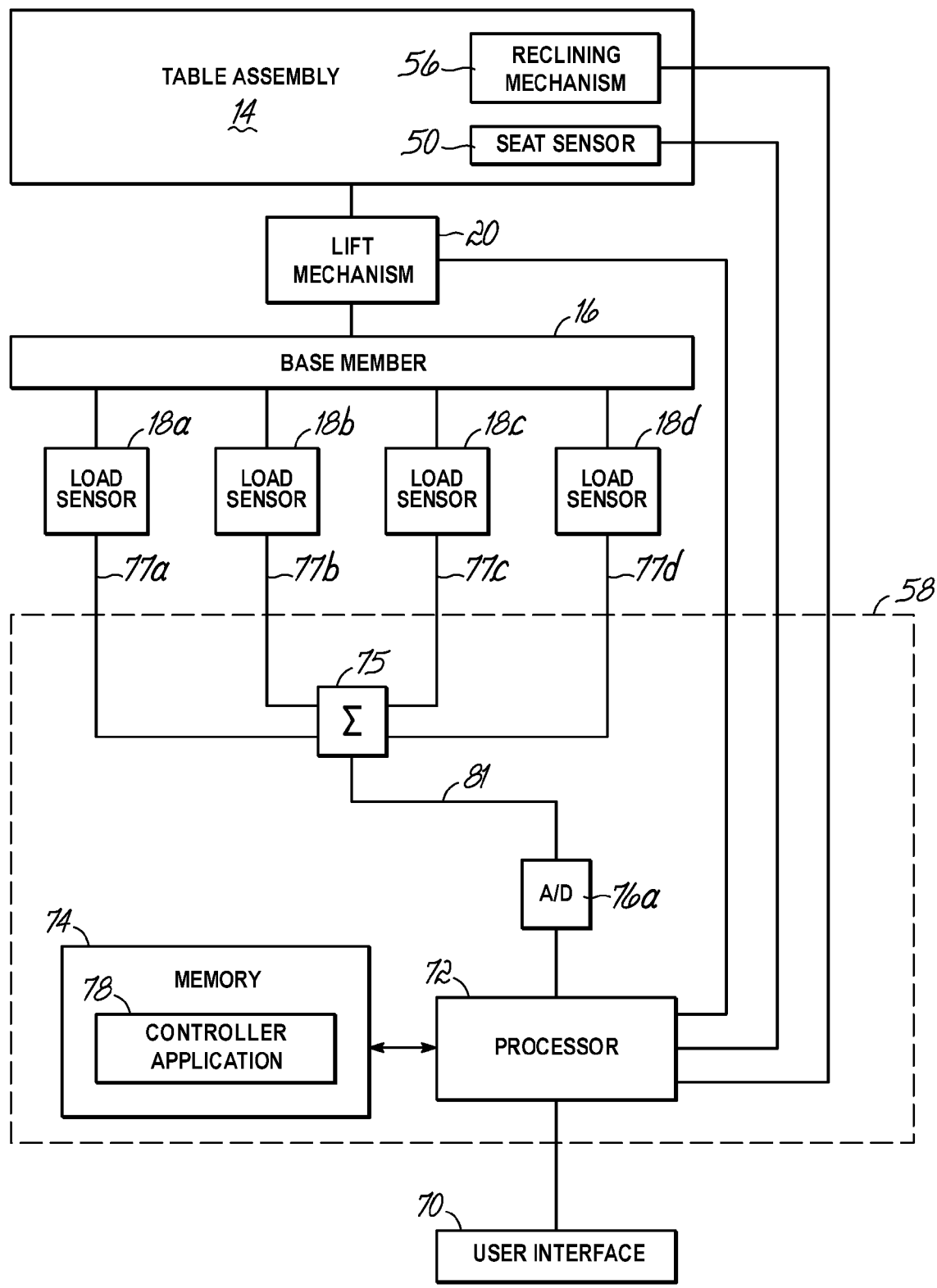
FIG. 5B is a schematic block diagram of an alternative medical examination table control system including load sensors and a controller that includes a summing circuit for use with the medical examination table of FIGS. 1-4.

Referring now to FIGS. 5A and 5B, the examination table controller 58 includes a processor 72, a memory 74, an optional summing circuit 75, and one or more analog to digital (ND) converters 76a-76d. Processor 72 may include one or more devices selected from microprocessors, microcontrollers, digital signal processors, microcomputers, central processing units, field programmable gate arrays, programmable logic devices, state machines, logic circuits, analog circuits, digital circuits, and/or any other devices that manipulate signals (analog and/or digital) based on operational instructions that are stored in memory 74. Memory 74 may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, and/or any other device capable of storing digital information.

In an embodiment of the invention, the A/D converters 76a-76d are operatively coupled to the output of respective load sensors 18a-18d, and convert output signals 77a-77d generated by the load sensors 18a-18d into a digital form suitable for use by the processor 72. In an alternative embodiment of the invention illustrated in FIG. 5B, the outputs of the load sensors 18a-18d may be coupled to the summing circuit 75. The summing circuit 75 may, in turn, generate a composite load sensor signal 81 that is proportional to the sum of the output signals 77a-77d generated by the load sensors 18a-18d. The composite load sensor signal 81 may be operatively coupled to a single A/D converter 76a that converts the signal 81 into a digital form suitable for use by the processor 72. The summing circuit 75 may include resistors and/or buffer amplifiers that combine the output signals 77a-77d in a known manner to generate the composite load signal sensor 81. Advantageously, embodiments including the summing circuit 75 may have reduced cost and lower system noise as compared to embodiments with multiple A/D converters. However, embodiments utilizing a single A/D converter may have a reduced ability to determine weight distributions, as is described in more detail below.

Processor 72 executes computer program code in the form of a controller application 78 that comprises one or more instructions resident in memory 74. The controller application instructions, when read and executed by processor 72, cause the controller 58 to perform the steps necessary to execute steps or elements embodying the various aspects of embodiments of the invention. Moreover, these steps may be performed in response to inputs to a user interface 79. The user interface 79 is operatively coupled to the processor 72, and includes the control panel 60, and foot pedal 62. The user interface 79 may also include additional input devices and controls (not shown), such as an alphanumeric keyboard, a pointing device, keypads, pushbuttons, control knobs, etc., capable of accepting commands or input from an examination table operator and transmitting the entered input to the processor 72. The user interface 79 may also include additional output devices, such as alphanumeric displays, a touch screen, a speaker, and other visual or audible indicators suitable for conveying information to the examination table operator, such as a patient's weight.

Processor 72 is operatively coupled to lift mechanism 20 and reclining mechanism 56 so that controller 58 can selectively activate lift motor 24 and backrest motor 54. The controller 58 may thereby raise and lower the support surface 30, as well as adjust the position of the backrest portion 48 of support surface 30 in response to signals from load sensors 18a-18d, seat sensor 50, user interface 79, and/or any other suitable sensor or input device. In particular, the controller application 78 may cause the processor 72 to sample and store in memory 74 load sensor output signals 77a-77d (and/or composite load sensor signal 81 as the case may be) that represent the forces being applied to the respective load sensors 18a-18d.

Figure 6:
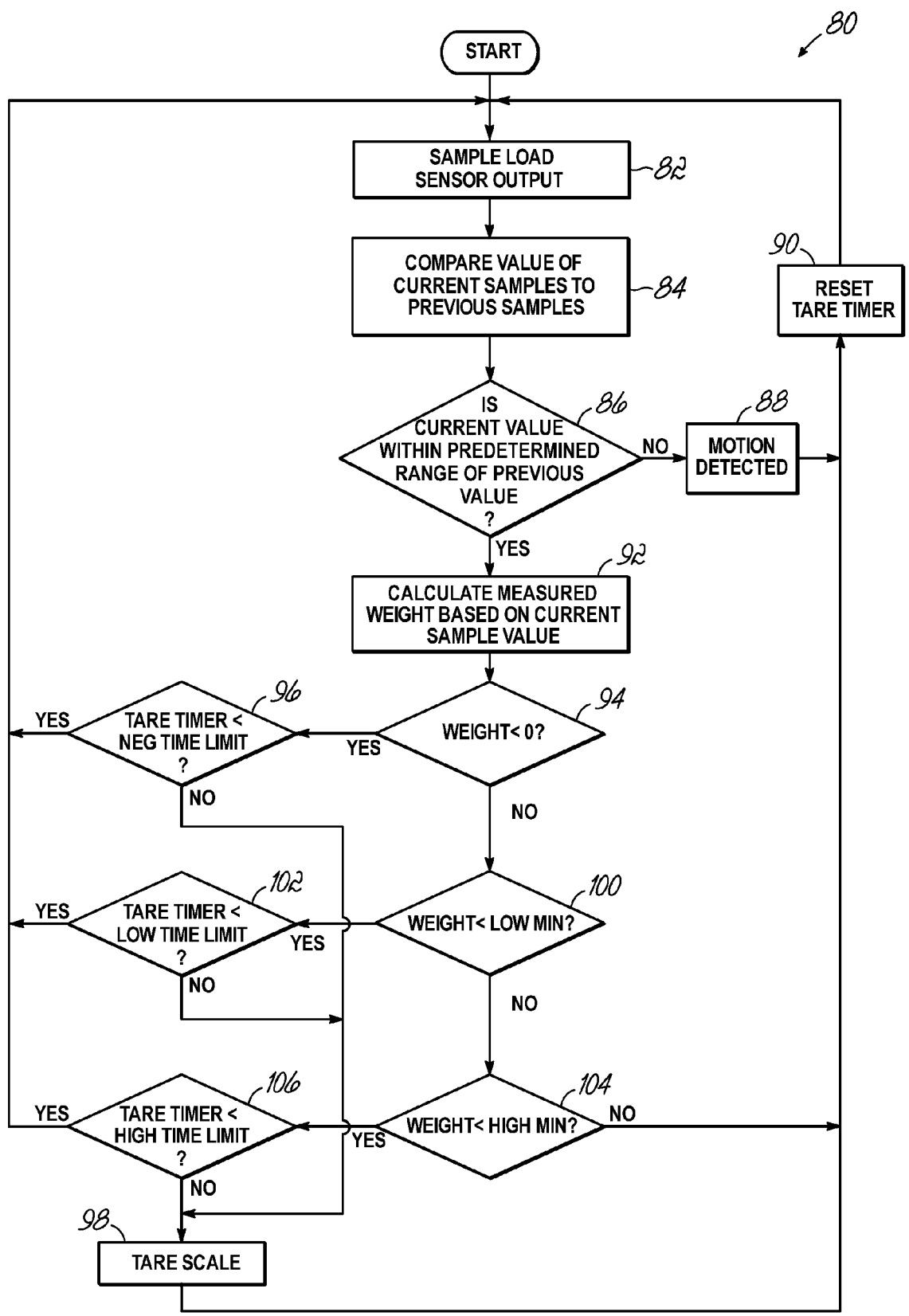
FIG. 6 is a flow chart illustrating an exemplary auto taring operation for use with the controller of FIGS. 5A and 5B.

Referring now to FIG. 6, the controller application 78 may include program code that causes the processor to perform an auto taring operation 80. The auto taring operation 80 typically runs continuously while the examination table 10 is powered so that the examination table 10 is normally ready to weigh a patient without the operator having to manually tare the scale prior to the patient positioning themselves on the examination table 10.

To this end, in block 82, the processor 72 samples the load sensor output signals 77a-77d and/or composite load sensor signal 81 by storing load sensor signal data from the A/D converter(s) 76a-76d in memory 74. In a preferred embodiment of the invention, the A/D converter(s) 76a-76d are delta-sigma converters having a summing interval that is large compared to the converter's sampling rate. The output of each A/D converter 76a-76d in this preferred embodiment is thus digital data that represents an average value of the associated load sensor output signal level over the previous summing interval, which is typically set to about 100 mS. Persons having ordinary skill in the art will understand, however, that other summing intervals and/or types of analog to digital converters may be used. For example, embodiments of the invention may use a 10 mS summing interval. Nor is the invention limited to sigma-delta A/D converters. For example, the A/D converters 76a-76d may include flash A/D converters operating at various sample rates and resolutions coupled with analog and/or digital filtering to provide suitable digital representations of the load sensor output signals 77a-77d, and/or composite load sensor signal 81, to the processor 72.

In block 84, the processor 72 compares the value of the current output signal samples to previous output signal samples. In embodiments lacking the summing circuit 75, this may include summing the current output signal sample values in the processor 72 to obtain a single value proportional to the total weight supported by the load sensors 18a-18d during the current sample period. The sum of the current output signal values may then be compared a previous sum of the output signal values. If the sum of the current output signal values is not within a predetermined range of the sum of the previous output signal values ("NO" branch of decision block 86), the processor 72 proceeds to block 88 and determines that there is motion associated with the examination table 10. A source of motion associated with the examination table 10 could be, for example, a patient entering or exiting the table, or who is adjusting their position on the examination table 10. In response to determining the presence of motion associated with the examination table 10, the processor 72 proceeds to block 90 and resets a tare timer before returning to block 82 to close the process loop.

If the sum of the current output signal values is within a predetermined range of the sum of the previous output signal values ("YES" branch of decision block 86), the processor 72 proceeds to block 92. In block 92, the processor 72 calculates a measured weight value by subtracting a tare weight value stored in memory 74 from the sum of the current output signal values. The measured weight value thus represents a value related to a change in the weight being supported by the load sensors 18a-18d since the tare weight value was last updated. Once the measured weight value has been determined, the processor 72 proceeds to block 94.

In block 94, the processor 72 determines if the measured weight value is negative. A negative measured weight value would typically indicate that: (1) there is no patient currently on the table, and (2) a supply item, such as a gown stored in a drawer; a table accessory, such as a chair arm; or some other item has been removed from the examination table 10. In response to determining the measured weight is negative ("YES" branch of decision block 94), the processor proceeds to block 96 and determines if the tare timer has exceeded the negative level time limit. Typically, a negative measured weight indicates that the scale should be tared immediately. Thus, a typical value for the negative time limit may be about one second. If the tare timer is less than the negative time limit ("YES" branch of decision block 96), the processor 72 returns to block 82 and samples the load sensor output signals 77a-77d by storing load sensor output signal data from the A/D converter(s) 76a-76d in memory 74 as previously described. The processor 72 thereby allows the tare timer to continue incrementing in response to the timer being less than the negative time limit. If, on the other hand, the tare timer is not less than the negative time limit ("NO" branch of decision block 96), then the processor 72 proceeds to block 98 and tares the scale by storing the sum of the current output signal values in memory 74 as the new tare weight value. Once the scale has been tared in block 98, the processor 72 proceeds to block 90 and resets the tare timer as previously described.

If the measured weight value is not negative ("NO" branch of decision block 94), the processor proceeds to block 100 and determines if the measured weight value is less than a low minimum level. A typical low minimum level may be a measured weight value representing a weight of about 10 lbs. A measured weight between zero and ten pounds might indicate, for example, that the examination table has been restocked by placing supplies in one of the storage drawers 34 since the tare weight was stored in memory 74. In response to determining the measured weight is below the low minimum level ("YES" branch of decision block 100), the processor 72 proceeds to block 102 and determines if the tare timer has exceeded the low level time limit. Because placing an item in one of the table storage drawers 34 typically takes a few seconds, a typical value for the low level time limit may be about ten seconds. If the tare timer is less than the low level time limit ("YES" branch of decision block 102), the processor 72 returns to block 82 and samples the load sensor output signals 77a-77d by storing load sensor output signal data from the A/D converter(s) 76a-76d in memory 74 as previously described, thereby allowing the tare timer to continue incrementing. If the tare timer is not less than the low level time limit ("NO" branch of decision block 102), then the processor 72 proceeds to block 98 and tares the scale by storing the sum of the current output signal values in memory 74 as the new tare weight value. Once the scale has been tared, the processor 72 proceeds to block 90 and resets the tare timer as previously described.

If the measured weight is not less than the low minimum level ("NO" branch of decision block 100), the processor 72 proceeds to block 104 and determines if the measured weight value is less than a high minimum level. A typical high minimum level may be a measured weight value representing a weight of about 25 lbs. A measured weight between 10 and 25 pounds might indicate, for example, that the examination table has been modified by adding a new accessory. In response to determining the measured weight is below the high minimum level, the processor proceeds to block 106 ("YES" branch of decision block 104) and determines if the tare timer has exceeded the high level time limit. Because a weight between 10 and 25 pounds might indicate the occurrence of an event that typically would last several minutes, a typical value for the high level time limit may be about 30 minutes.

If the tare timer value is less than the high level time limit ("YES" branch of decision block 106), the processor 72 returns to block 82 and samples the load sensor output signals 77a-77d by storing load sensor signal output data from the A/D converter(s) 76a-76d in to memory 74 as previously described, thereby allowing the tare timer to continue incrementing. If the tare timer is not less than the high level time limit ("NO" branch of decision block 106), then the processor 72 proceeds to block 98 and tares the scale by storing the sum of the current output signal values in memory 74 as the new tare weight value. Once the scale has been tared, the processor 72 proceeds to block 90 and resets the tare timer as previously described.

The auto taring operation 80 thus results in the examination table scale being tared regularly when no one is on the table and the table weight is stable. Thus, when a patient mounts the examination table 10, there is a high likelihood that the table has recently been tared. Advantageously, the auto taring operation 80 thus reduces the incidence of patients being weighed without first taring the scale, thereby increasing weighing accuracy.

Figure 7:
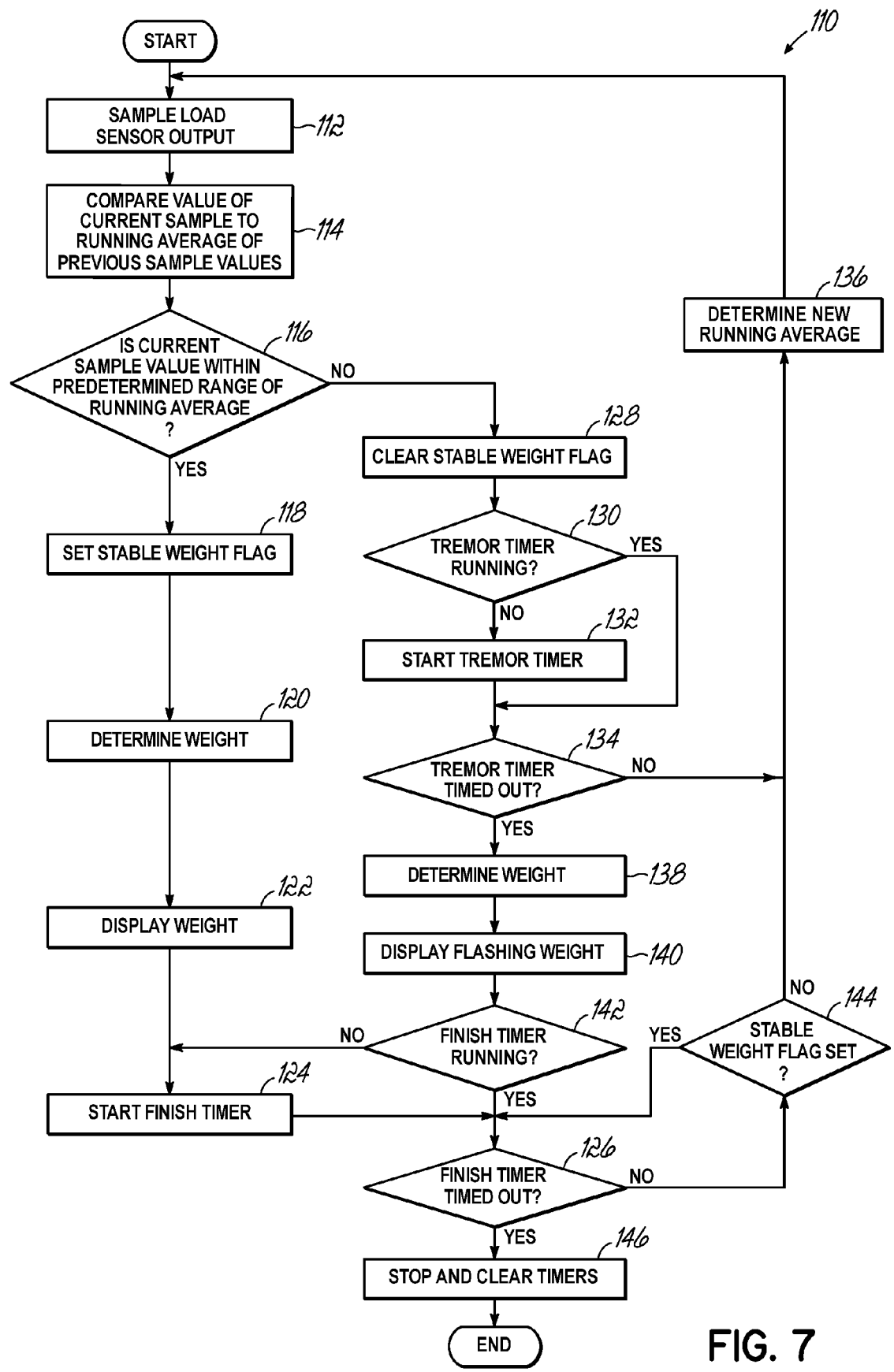
FIG. 7 is a flow chart illustrating an exemplary weight capture operation for use with the controller of FIGS. 5A and 5B.

Another problem encountered when trying to weigh a patient is that some patients are unable to remain still long enough for the scale to capture a stable weight. This situation may occur, for example, if the patient has Parkinson's disease or some other condition that causes involuntary movement or tremors. Referring now to FIG. 7, to address the problem of moving patients, the controller application 78 may include a weight capture operation 110 that enables the processor 72 to determine the weight of a patient suffering from tremors. To this end, in block 112, the processor 72 samples the load sensor output signals 77a-77d by storing load sensor signal data from the A/D converter(s) 76a-76d in memory 74 in essentially the same manner as described previously with reference to FIG. 6. The processor 72 then proceeds to block 114 and compares the sum of the current output signal values to a running average of previous sums. In an embodiment of the invention, the running average consists of an average of the two most recent previous sums of the output signal values. However, other numbers of previous values may be used to generate the running average, and the invention is not limited to including any particular number previous samples in the running average. Conversely, the running average could be comprised of a single previous sum of the output signal values.

If the sum of the current output signal values is within a predetermined range of the running average ("YES" branch of decision block 116), the processor 72 proceeds to block 118. In a typical weight capture operation configuration, the predetermined range may be set so that if the sum of the current output signal values represents a weight within 0.2 pounds of the weight represented by the running average, the processor 72 will proceed to block 118. However, other predetermined ranges may be used, and the invention is not limited to a particular range. For example, the predetermined range may be selectable depending on the severity of the patient's tremors, or to allow operators to capture patient weights under varying conditions.

In block 118, the processor 72 sets a stable weight flag, indicating a stable weight has been captured. The processor 72 then proceeds to block 120 and determines the patient's weight by subtracting the tare weight value from the sum of the current output signal values to generate a patient weight value. The patient weight value is then multiplied by a scaling factor that converts the patient weight value into the desired units of measure. The desired units will typically be either pounds or kilograms, but any suitable unit of measure may be displayed, with the desired unit selected in response to the system operator pressing the unit selection button 71. Once the patient's weight value has been converted to the desired unit of measure, the processor 72 proceeds to block 122 and displays the patient's weight via the user interface 79, such as by causing the display 63 to provide a visual indication of the patient's weight. The processor then proceeds to block 124 and starts a finish timer before proceeding to decision block 126.

If the sum of the current output signal values is not within the predetermined range of the running average ("NO" branch of decision block 116), the processor 72 proceeds to block 128 and clears the stable weight flag, indicating a stable weight has not been captured. Thus, the stable weight flag will typically be cleared if a patient on the examination table is experiencing a period of tremors severe enough make obtaining an accurate weight difficult and a stable weight has not yet been captured. After clearing the stable weight flag, the processor 72 proceeds to decision block 130 and determines if a tremor timer is running. If the tremor timer is not running ("NO" branch of decision block 130), the processor 72 proceeds to block 132 and starts the tremor timer before proceeding to decision block 134. If the tremor timer is running ("YES" branch of decision block 130), the processor 72 proceeds directly to decision block 134, thereby bypassing block 132.

In decision block 134, the processor 72 determines if the tremor timer has timed out, which would indicate that the weight capture operation 110 had not been able to capture a stable weight for predetermined amount of time. Typically, the tremor timer value is selected to provide sufficient time to allow an "active" patient to become still, but that causes the tremor timer to time out before the examination table operator becomes frustrated or concerned that the scale is not functioning properly. To this end, the predetermined tremor timer value may be selected to cause the tremor timer to timeout in about 10 seconds.

If the tremor timer has not timed out ("NO" branch of decision block 134), the processor 72 proceeds to block 136 and determines a new running average that includes the sum of the current output signal values. The processor 72 then stores the new running average in memory 74 before returning to block 112 and obtaining a new set of current output signal values as previously described.

If the tremor timer has timed out ("YES" branch of decision block 134), the processor 72 proceeds to block 138 and determines a weight based on the current output signal values in a similar manner as previously described with respect to block 120. The processor 72 then proceeds to block 140 and displays the patient's weight via the user interface 79 along with an indication that the displayed weight is not stable. For example, the processor 72 may cause the display 63 to provide a visual indication of the patient's weight that flashes periodically, thereby informing the examination table operator that the scale has not yet captured a stable weight. The processor 72 then proceeds to decision block 142 to determine if the finish timer is running. If the finish timer is not running ("NO" branch of decision block 142), the processor 72 proceeds to block 124 and starts the finish timer. If the finish timer is running, the processor 72 proceeds to block 126.

In block 126, the processor 72 determines if the finish timer has timed out. If the finish timer has not timed out, the processor 72 proceeds to decision block 144 and determines if the stable weight flag is set. If the stable weight flag is set, thereby indicating that the processor 72 has captured a stable weight, the processor returns to decision block 126. A set stable weight flag thus causes the processor 72 to continue looping between block 144 and 126 until the finish timer times out so that the stable weight is displayed for a time that is determined by the finish timer. If the stable weight flag is not set ("NO" branch of decision block 144), the processor 72 proceeds to block 136 and begins the process of obtaining a new set of load sensor output signals 77a-77d. In this way, if a stable weight has not yet been captured, the processor 72 continues to try and capture a stable weight until the finish timer times out while displaying a varying weight based on the current output signal values.

If the finish timer has timed out ("YES" branch of decision block 126), the processor 72 ceases causing the user interface 79 to display the patient's weight and proceeds to block 146. Although illustrated as stopping and clearing the tremor and finish timers before exiting the weight capture operation 110 in block 146, persons having ordinary skill in the art will understand that the timers may be stopped and cleared at other suitable times. For example, the timer functions may be stopped and cleared before commencing the weight capture operation 110.

In an alternative embodiment of the invention, the controller 58 may include one or more digital and/or analog filters for processing an extended number of samples of the load sensor output signals 77a-77d and/or composite load sensor signal 81. To this end, the processor 72 may include algorithms that determine one or more frequencies associated with patient movements, and/or that filter the load sensor output signals 77a-77d and/or composite load sensor signal 81 to facilitate capturing a stable weight. By way of example, a patient with tremors may produce a weight reading that is oscillatory in nature within a range of weights. By applying a low pass filter to the extended number of samples, the processor 72 may thereby extract a stable weight from the oscillating weight. In an embodiment of the invention, the low pass filter feature may include the processor 72 determining an average of the extended number of samples. In another embodiment of the invention, the processor 72 may determine a Discrete Fourier Transform (DFT) of the extended number of samples to determine one or more frequencies of oscillation associated with uncontrollable patient motion. The processor 72 may then remove these frequencies in either the frequency domain and/or by applying a Finite Impulse Response (FIR) or other digital filter to the extended number of samples.

Typically, the examination table 10 will initially be in a lowered position so that the patient, whose movement may be impaired due to illness, can easily sit on the table assembly 14. However, in order to accurately measure the weight of a patient, the table assembly 14 must be at a sufficient height so that the patient is fully supported by the examination table 10. That is, the patient must be elevated sufficiently so that their feet are not touching the floor or some other supporting surface, such as a stepping stool. This elevation step may be performed by the table operator via manual operation of the table assembly 14 using the control panel 60 or foot pedal 62. However, it is preferable to save the table operator the effort of raising the table assembly 14. In addition, the table operator may forget to raise the table assembly 14, or fail to raise the table assembly 14 sufficiently before weighing the patient.

Figure 8:
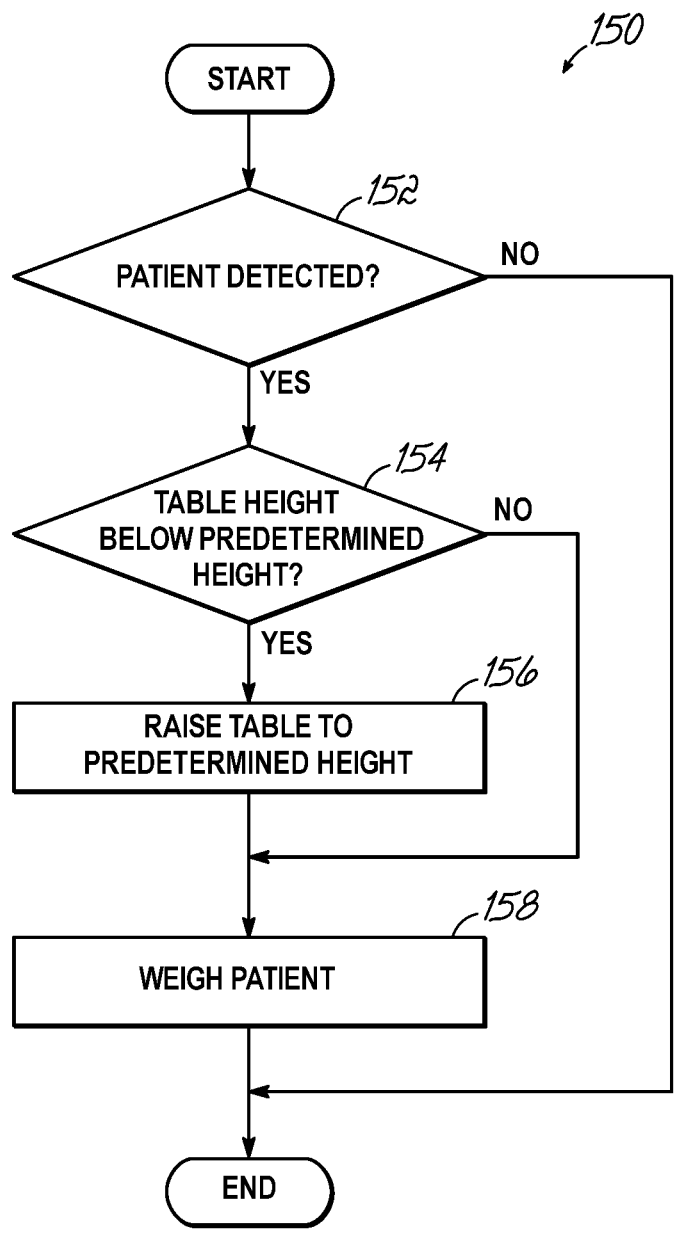
FIG. 8 is a flow chart illustrating an exemplary auto raise operation for use with the controller of FIGS. 5A and 5B.

Referring now to FIG. 8, in response to the table operator requesting the patient's weight, such as by pressing the weight request button 69, the processor 72 may execute an auto raise operation 150. To this end, in block 152, the processor 72 determines if there is a patient seated on the examination table assembly 14. The processor 72 may determine that the patient is present based on the presence of motion associated with the examination table. This motion may be determined based on the load sensor output signals 77a-77d, as previously described with respect to FIG. 6. In an alternative embodiment of the invention that includes optional seat sensor 50, the processor 72 may determine the presence of the patient based on a signal generated by the seat sensor 50. In any case, if the processor 72 does not detect the presence of a patient ("NO" branch of decision block 152), the processor 72 exits the auto raise operation without raising the table assembly 14.

If the processor 72 determines that the patient is present ("YES" branch of decision block 152, the processor proceeds to block 154 and determines if the current table assembly height is below a predetermined height. The height of the table assembly 14 may be determined in a conventional manner, such with potentiometer position sensors (not shown) that are directly coupled to the table assembly 14 to detect movement and track the position of the table assembly 14. In an alternative embodiment of the invention, the height of the table assembly 14 may be determined by monitoring position sensors in the lift motor 24, as is more fully described in the aforementioned U.S. Patent Publication No. 2012/0042451. If the height of the table assembly 14 is below the predetermined height ("YES" branch of decision block 154), the processor 72 proceeds to block 156 and raises the table assembly 14 to the predetermined height before proceeding to block 158.

If the height of the table assembly 14 is not below the predetermined height ("NO" branch of decision block 154), the processor proceeds to block 158 without altering the height of the table assembly 14. Thus, if the height of the table assembly 14 is at or above the predetermined height because, for example, the table assembly 14 was raised previously, the processor 72 will weigh the patient without further movement of the table assembly 14.

Figure 9:
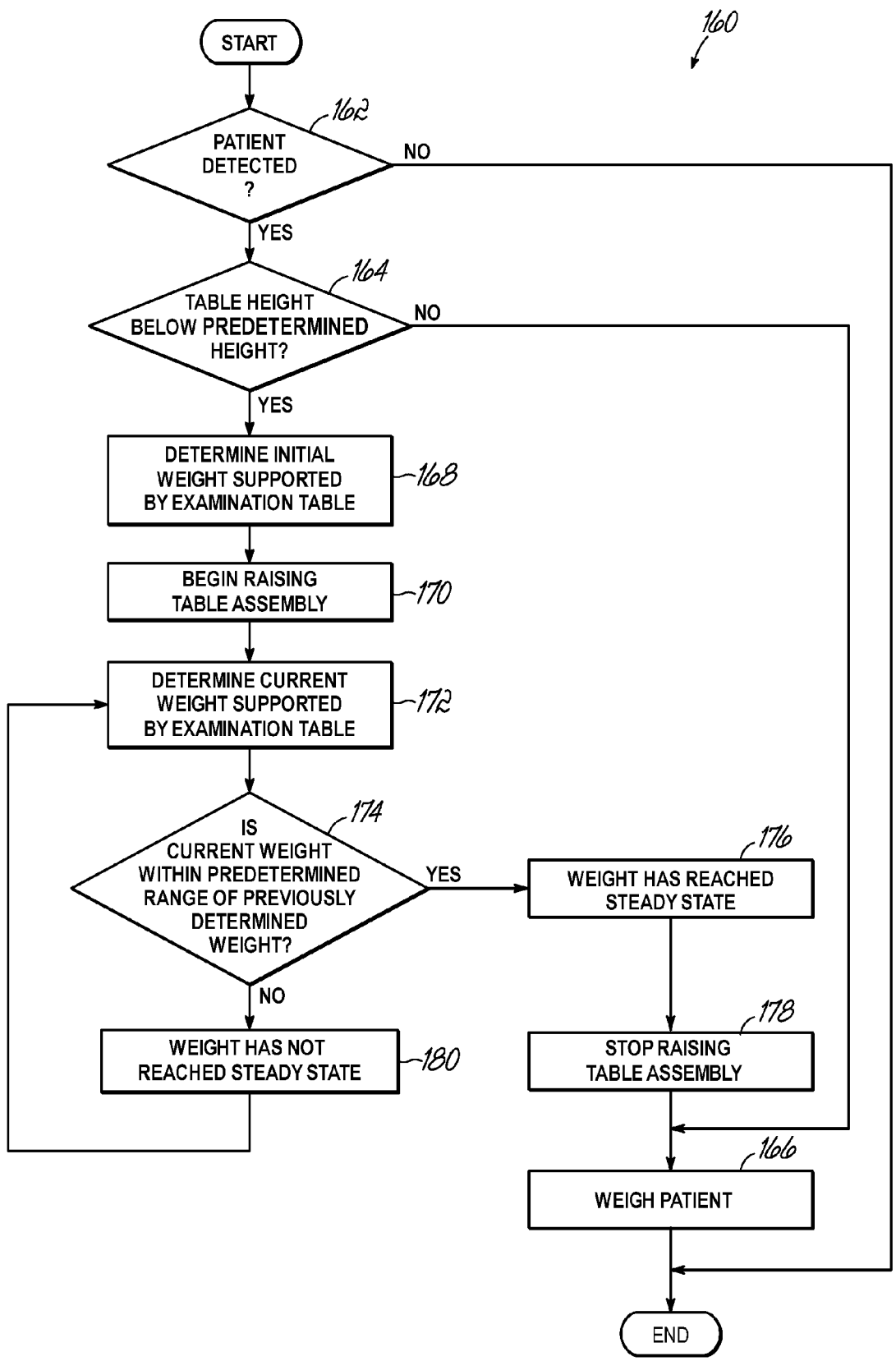
FIG. 9 is a flow chart illustrating an alternative auto raise operation for use with the controller of FIGS. 5A and 5B.

Referring now to FIG. 9, in an alternative embodiment of the invention and in response to the table operator requesting the patient's weight, such as by pressing the weight request button 69, the processor 72 executes an auto raise operation 160. To this end, in block 162, the processor 72 determines if there is a patient seated on the examination table assembly 14 as previously described with respect to FIG. 8. If the processor 72 does not detect the presence of a patient ("NO" branch of decision block 162), the processor 72 will exit the auto raise operation 160 without adjusting the height of the table assembly 14.

If the processor 72 determines that the patient is present ("YES" branch of decision block 162), the processor proceeds to block 164 and determines if the current height of the table assembly 14 is below the predetermined height. If the height of the table assembly 14 is not below the predetermined height ("NO" branch of decision block 164), the table assembly 14 does not need to be raised, and the processor proceeds to block 166 without altering the height of the table assembly 14. If the height of the table assembly 14 is below the predetermined height ("YES" branch of decision block 164), the processor 72 proceeds to block 168.

In block 168, the processor 72 determines an initial weight that is being supported by the examination table 10 based on samples of the load sensor output signals 77a-77d as previously described with respect to FIG. 6. The processor 72 then proceeds to block 170 and activates the lift motor 24, thereby causing the table assembly 14 to begin moving upward. The processor 72 then proceeds to block 172 and determines the current weight being supported by the examination table 10 based on samples of the load sensor output signals 77a-77d as previously described with respect to FIG. 6 before proceeding to block 174.

In block 174, the processor 72 compares the current weight supported by the examination table 10 to a previously determined weight (e.g., the initial weight or a previously determined current weight) supported by the examination table 10. As the table assembly 14 is raised, the amount of the patient's weight being supported by the patient's feet will tend to drop. As a result, the weight supported by the examination table 10, and thus sensed by the load sensors 18a-18d, will typically increase as the table assembly 14 is raised. This increase in weight will continue until the patient's feet are suspended above the floor, at which point the weight sensed by the load sensors 18a-18d will stop increasing. By comparing the currently determined weight to the previously determined weight as the table assembly 14 is raised, the processor 72 may determine when the table assembly 14 has been raised enough so that the patient's feet are no longer touching the floor.

If the currently determined weight is within a predetermined range of the previously determined weight ("YES" branch of decision block 174), the processor 72 proceeds to block 176 and determines that the weight has reached a steady state. Based on this determination, the processor proceeds to block 178 and stops raising the table assembly 14 by deactivating the lift motor 24. The processor 72 then proceeds to block 166 and weighs the patient as previously described.

If the currently determined weight is not within the predetermined range of the previously determined weight ("NO" branch of decision block 174), the processor 72 proceeds to block 180 and determines that the weight supported by the examination table 10 has not reached a steady state. Based on this determination, the processor returns to block 172, where the processor 72 samples the load sensor output signals 77a-77d and determines a new current weight supported by the examination table 10 as described previously. The processor 72 thus repeatedly determines and compares the current weight supported by the examination table 10 to the previous weight supported by the examination table 10 until the processor 72 determines that the weight supported by the examination table 10 has reached a steady state. In response to determining the weight has reached a steady state, the processor 72 deactivates the lift motor 24, which halts the upward movement of the table assembly 14.

Figure 10:
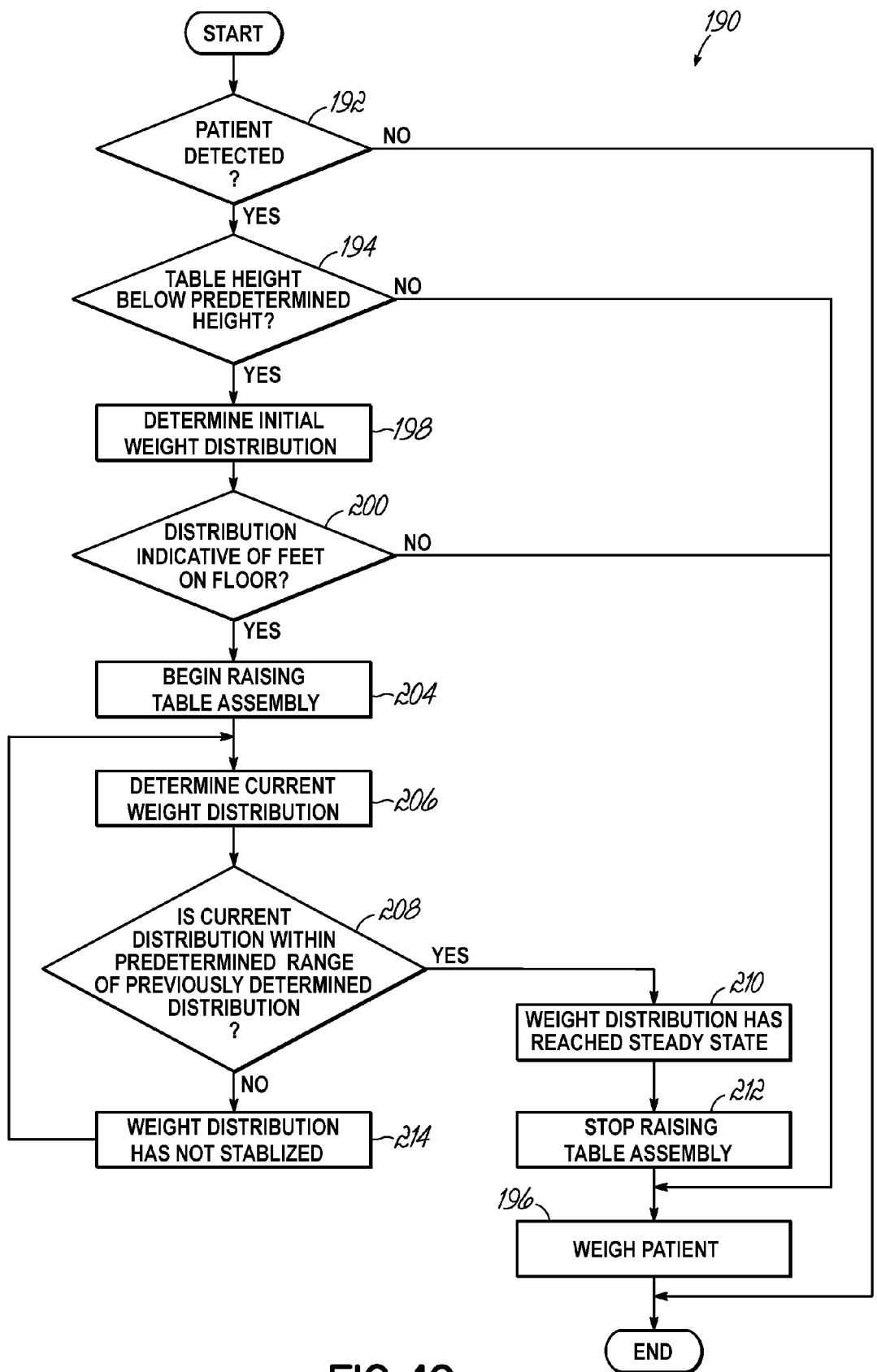
FIG. 10 is a flow chart illustrating another alternative auto raise operation for use with the controller of FIGS. 5A and 5B.

Referring now to FIG. 10, in an alternative embodiment of the invention and in response to the table operator requesting the patient's weight, such as by pressing the weight request button 69, the processor 72 executes an auto raise operation 190. To this end, in block 192, the processor 72 determines if there is a patient seated on the examination table assembly 14 as previously described with reference to FIGS. 8 and 9. If the processor 72 does not detect the presence of a patient ("NO" branch of decision block 192), the processor 72 exits the auto raise function 190 without adjusting the height of the table assembly 14.

If the processor 72 determines that the patient is present ("YES" branch of decision block 192), the processor proceeds to block 194 and determines if the height of the current table assembly 14 is below the predetermined height. If the height of the table assembly 14 is not below the predetermined height ("NO" branch of decision block 194), the table assembly 14 does not need to be raised, and the processor 72 proceeds to block 196 without altering the height of the table assembly 14. If the height of the table assembly 14 is below the predetermined height ("YES" branch of decision block 194), the processor 72 proceeds to block 198. In an alternative embodiment of the invention, the processor 72 may skip the step of determining if the height of the table assembly 14 is below the predetermined height and proceed directly from decision block 192 to block 198, in which case decision block 194 may be omitted.

In block 198, the processor 72 determines an initial weight distribution of a load being supported by the table assembly 14 based on samples of the load sensor output signals 77a-77d. To this end, the processor 72 may compare samples of the individual load sensor output signals 77a-77d to each other and/or a sum of the load sensor output signals 77a-77d for a given sample period to determine a weight distribution or a location of a center of gravity for the examination table 10. The processor 72 may then proceed to block 200. In block 200, the weight distribution (e.g., the location of the center of gravity) determined in block 198 is compared to an expected range of weight distributions indicative of a table assembly 14 that is supporting a patient whose feet are touching the floor or some other supporting surface. If the processor 72 determines that the weight distribution indicates the patient's feet are not touching the floor ("NO" branch of decision block 200), the processor 72 proceeds to block 196 and determines the weight of the patient as described previously with reference to FIGS. 8 and 9. If the processor 72 determines that the weight distribution indicates that the patient's feet are touching the floor ("YES" branch of decision block 200), the processor 72 proceeds to block 204, where the processor 72 begins raising the table assembly 14 by activating the lift motor 24. In an alternative embodiment of the invention that includes step 194, the processor 72 may skip step 200, in which case the processor 72 will proceed directly from block 198 to block 204 without comparing the initial weight distribution to the expected range of weight distributions. In any case, after activating the lift motor 24 to begin raising the table assembly 14, the processor 72 proceeds to block 206.

In block 206, the processor 72 determines a current weight distribution of the load being supported by the table assembly 14 based on samples of the load sensor output signals 77a-77d as previously described with respect to obtaining the initial weight distribution. The processor 72 then proceeds to decision block 208, where the processor 72 compares the current weight distribution to a previously determined weight distribution (e.g., the initial weight distribution or a previously determined current weight distribution) of the load being supported by the table assembly 14. As the table assembly 14 is raised, the amount of the patient's weight being supported by the patient's feet may be reduced. As a result, the weight distribution of the load supported by the table assembly 14 will shift as the table assembly 14 is raised. This shift in the weight distribution will continue until the patient's feet are suspended above the floor, at which point the weight distribution determined from the weight sensed by the load sensors 18a-18d will stop shifting. By comparing the currently determined weight distribution to the previously determined weight distribution as the table assembly 14 is raised, the processor 72 may determine when the table assembly 14 has been raised enough so that the patient's feet are no longer touching the floor.

If the currently determined weight distribution is within a predetermined range of the previously determined weight distribution ("YES" branch of decision block 208), the processor 72 proceeds to block 210 and determines that the weight distribution has reached a steady state. Based on this determination, the processor 72 proceeds to block 212 and stops raising the table assembly by deactivating the lift motor 24. The processor 72 then proceeds to block 196 and determines the weight of the patient.

If the currently determined weight distribution is not within the predetermined range of the previously determined weight ("NO" branch of decision block 208), the processor 72 proceeds to block 214 and determines that the weight distribution has not reached a steady state. Based on this determination, the processor returns to block 206, where the processor 72 samples the load sensor output signals 77a-77d and determines a new current weight distribution of the load being supported by the table assembly 14 as described previously. The processor 72 thereby repeatedly determines and compares the current weight distribution of the load supported by the table assembly 14 to the previous weight distribution of the load supported by the table assembly 14 until the processor 72 determines that the weight distribution has stabilized. In response to determining a stable weight distribution has been reached, the processor 72 deactivates the lift motor 24, which halts the upward movement of the table assembly 14. The processor 72 then determines the weight of the patient.

While the present invention has been illustrated by a description of one or more embodiments thereof, and while these embodiments have been described in considerable detail, they are not intended to restrict or in any way limit the scope of the appended claims to such detail. Additional advantages and modifications will readily appear to those skilled in the art. For example, the examination table 10 could include less than four load sensors 18a-18d (e.g., three sensors) or more than four sensors 18a-18d without departing from the spirit of the invention. The load sensors 18a-18d could also be located in another part of the examination table 10, such as between the table assembly 14 and lift mechanism 20, so long as the load sensors 18a-18d are configured to support a portion of the examination table 10 that in turn supports the patient. Moreover, it should be appreciated that the various features, applications, and devices disclosed herein may also be used alone or in any combination. The invention in its broader aspects is therefore not limited to the specific details, representative apparatus and method, and illustrative examples shown and described. Accordingly, departures may be made from such details without departing from the scope of the general inventive concept.

What is claimed is:

1. A medical examination table, comprising:
   (a) one or more load sensors operatively coupled to the examination table, wherein each of the one or more load sensors is configured to generate a signal in response to a force applied to the load sensor by at least a portion of the examination table; and
   (b) a controller operatively coupled to the one or more load sensors, wherein the controller is configured to determine a weight associated with the examination table based on one or more signals generated by the one or more load sensors, the controller being further configured to determine if motion is present based on the signals generated by the one or more load sensors, and wherein the controller is further configured to tare the examination table if no motion is present for a predetermined taring period,
   wherein the predetermined taring period is varied based on the weight associated with the examination table.

2. The examination table of claim 1, wherein the controller is further configured to require that the determined weight associated with the examination table be within a predetermined tare weight range to tare the examination table.

3. The medical examination table of claim 2, wherein the predetermined tare weight range is based on an expected static load on the one or more load sensors when the examination table is not supporting a patient.

4. The medical examination table of claim 1, wherein the controller is configured to tare the examination table by determining a current weight of at least a portion of the examination table and storing the current weight of the at least a portion of the examination table as a tare weight.

5. The medical examination table of claim 1, wherein predetermined taring period is set to a first time value if the weight associated with the examination table is within a first weight range, and is set to a second time value if the weight associated with the examination table is within a second weight range.

6. The medical examination table of claim 1, wherein the controller is configured to determine the weight associated with the examination table based on the signals received from the plurality of load sensors by:
   (i) sampling the one or more signals generated by the one or more load sensors over a sampling period,
   (ii) determining an average value for the signal samples of the one or more signals over the sampling period,
   (iii) determining a current weight associated with the examination table from the average value for the signal samples from the most recent sampling period,
   (iv) comparing the current weight to a benchmark weight determined from one or more previous weights, the one or more previous weights having been determined during one or more corresponding previous sampling periods, and
   (v) determining the current weight is a stable weight in response to the current weight being within a predetermined stability range of the benchmark weight.

7. The medical examination table of claim 6, wherein the benchmark weight is a running average of two or more previous weights.

8. The medical examination table of claim 6, wherein the controller is configured to display the current weight in response to determining that the current weight is a stable weight.

9. The medical examination table of claim 6, wherein the controller is configured to display the current weight along with an indication that the current weight is not a stable weight in response to the current weight not being a stable weight.

10. The medical examination table of claim 6, further comprising one or more delta-sigma analog to digital converters, each having a summing interval equal to the sampling period, wherein the one or more delta-sigma analog to digital converters are configured to sample the one or more signals generated by the one or more load sensors over the sampling period and determine an average value for the one or more signal samples over the sampling period.

11. The medical examination table of claim 6, wherein the controller is configured to process the current weight and the one or more previous weights through a filter to produce filtered weight, and display the filtered weight.

12. A medical examination table, comprising:
(a) a table assembly for receiving a patient;
(b) one or more load sensors operatively coupled to the examination table assembly, wherein each of the one or more load sensors is configured to generate a signal in response to a force applied to the load sensor by at least a portion of the table assembly;
(c) a controller operatively coupled to the one or more load sensors, wherein the controller is configured to determine a weight associated with the table assembly based on one or more signals generated by the one or more load sensors; and
(d) a motorized lift operatively coupled to the table assembly and the controller;
wherein the controller is configured to activate the motorized lift to raise the table assembly in response to activation of a weighing function by an operator if the controller determines that the patient is being supported by the examination table and that the patient's feet are touching a supporting surface;
wherein the controller is further configured to deactivate the motorized lift assembly to stop raising the table assembly in response to determining the patient's feet are not touching the supporting surface.

13. The medical examination table of claim 12, further comprising:
a seat switch operatively coupled to the controller, wherein the seat switch is configured to generate a signal in response to the patient being supported by the examination table, wherein the controller is further configured to determine that the patient is being supported by the examination table based on the signal generated by the seat switch.

14. The medical examination table of claim 12, wherein the controller is further configured to determine that the patient is being supported by the examination table based on the determined weight associated with the examination table being within a predetermined patient weight range.

15. The medical examination table of claim 12, wherein the controller is configured to determine if motion is present based on the signals from the one or more load sensors by:
(A) sampling the signals generated by the one or more load sensors to obtain a current signal sample,
(B) comparing the current signal sample with one or more previous signal samples, and
(C) if the current signal sample is outside a range of values associated with the one or more previous signal samples, determining that motion is present.

16. The medical examination table of claim 15, wherein the controller is configured to compare the current signal sample with the one or more previous signal samples by:
(1) summing the current signals generated by the one or more load sensors, and
(2) comparing a sample of the sum of the current signals generated by the one or more load sensors to a sample of the sum of the previous signals generated by the one or more load sensors.

17. The medical examination table of claim 15, wherein the controller is configured to compare the current signal sample with the one or more previous signal samples by:
(1) summing the current signals generated by the one or more load sensors, and
(2) comparing a sample of the sum of the current signals generated by the one or more load sensors to a running average of two or more samples of the sums of the previous signals generated by the one or more load sensors.

18. The medical examination table of claim 12, wherein the controller is configured to determine that the patient's feet are touching the supporting surface if the height of the table assembly is below a predetermined height.

19. The medical examination table of claim 12, wherein the controller is configured to determine that the patient's feet are not touching the supporting surface in response to the weight associated with the examination table assembly reaching a steady state.

20. The medical examination table of claim 19, wherein the weight associated with the examination table reaching a steady state is determined based on a currently determined weight associated with the examination table being substantially equal to a previously determined weight associated with the examination table.

21. The medical examination table of claim 12, wherein the controller is further configured to determine:
(i) a current weight distribution of a load supported by the table assembly based on the signals received from the one or more load sensors, and
(ii) that the patient's feet are not touching the supporting surface in response to the current weight distribution of the load supported by the table assembly reaching a steady state.

22. The medical examination table of claim 21, wherein the controller is configured to determine that the current weight distribution of the load supported by the table assembly has reached a steady state in response to the currently determined weight distribution of the load supported by the table assembly being substantially similar to a previously determined weight distribution of the load supported by the table assembly.

* * * * *

UNITED STATES PATENT AND TRADEMARK OFFICE
CERTIFICATE OF CORRECTION

| | | |
|---|---|---|
| PATENT NO. | : 8,978,181 B2 | Page 1 of 1 |
| APPLICATION NO. | : 13/425773 | |
| DATED | : March 17, 2015 | |
| INVENTOR(S) | : Robert Menke et al. | |

It is certified that error appears in the above-identified patent and that said Letters Patent is hereby corrected as shown below:

In the Claims

Column 16, claim 6, line 38, reads ". . . the plurality of load sensors . . ."; which should be deleted and replaced with ". . . the one or more load sensors . . .".

Signed and Sealed this
Twenty-first Day of July, 2015

Michelle K. Lee
*Director of the United States Patent and Trademark Office*